United States Patent
Moore

(10) Patent No.: US 6,356,327 B1
(45) Date of Patent: *Mar. 12, 2002

(54) PIXEL ARRAY FOR SILICON LC LIGHT VALVE FEATURING REFLECTIVE METAL SURFACE UNDERLYING INTER-PIXEL REGIONS

(75) Inventor: Paul McKay Moore, San Bruno, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/277,901

(22) Filed: Mar. 29, 1999

(51) Int. Cl.$^7$ ............................ G02F 1/1343; G03C 5/00

(52) U.S. Cl. ........................................ 349/139; 430/311

(58) Field of Search ................................ 349/139, 156, 349/25; 430/311, 317, 319

(56) References Cited

U.S. PATENT DOCUMENTS

| | | | |
|---|---|---|---|
| 4,185,894 A | 1/1980 | Hilton et al. | 350/338 |
| 4,999,619 A | 3/1991 | Velde | 340/784 |
| 5,473,448 A | 12/1995 | Yoshinaga et al. | 359/51 |
| 5,515,191 A | 5/1996 | Swirbel | 359/54 |
| 5,543,946 A | 8/1996 | Enomoto et al. | 359/87 |
| 5,570,215 A | 10/1996 | Ruiz et al. | 359/72 |
| 5,672,937 A | 9/1997 | Choi et al. | 313/503 |
| 5,702,871 A | 12/1997 | Choi et al. | 430/314 |
| 5,706,067 A | 1/1998 | Colgan et al. | 349/114 |
| 5,754,159 A | 5/1998 | Wood et al. | 345/102 |
| 5,764,324 A | 6/1998 | Lu et al. | 349/113 |
| 5,838,715 A | 11/1998 | Corzine et al. | 372/96 |
| 5,867,237 A | 2/1999 | Yazaki et al. | 349/86 |
| 6,008,876 A * | 12/1999 | Moore | 349/139 |
| 6,233,033 B1 * | 5/2001 | Moore | 349/139 |

OTHER PUBLICATIONS

Colgan, E.G., et al., "On–Chip Metallization Layers for Reflective Light Valves", IBM J. Res. Develop. vol. 42, No. 3/4 May/Jul. 1998, pp. 339–345.

Takayama, S., et al., "Effects of Y or Gd Addition on the Structures and Resistivities of Al Thin Films", J. Vac. Sci. Technol. A 14(4), Jul./Aug. 1996, pp. 2499–2504.

Takayama, S., et al., "Low Resistivity Al–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

O'Hara, A., et al., "Planarisation of Spatial Light Modulator Silicon Back–Planes Using Chemical–Mechanical Polishing", 1994 The Institution of Electrical Engineers, publishes by IEE, Savoy Place, London, WC2R Obl. UK, pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAN–Mode Light Valves", SID 92 Digest, ISSN 0097–0966X, pp. 277280.

* cited by examiner

Primary Examiner—William L. Sikes
Assistant Examiner—Dung Nguyen
(74) Attorney, Agent, or Firm—Stallman & Pollock LLP

(57) ABSTRACT

A pixel cell array for a silicon light valve positions a reflective metal surface underneath inter-pixel regions. This underlying reflective metal surface reflects incident light, thereby preventing absorption of light in inter-pixel regions that can disturb charge stored in underlying capacitors or cause dark lines to appear between electrodes. The underlying reflective metal surface can be formed as a plurality of discrete, floating, electrically-isolated structures. Alternatively, the underlying reflective metal surface can formed as a plurality of discrete structures linked to adjacent pixel electrodes through via structures. The underlying reflective metal surface can also be designed as a continuous grid including a contact for receiving an applied bias.

18 Claims, 11 Drawing Sheets

PIXEL ARRAY FOR SILICON LC LIGHT VALVE FEATURING REFLECTIVE METAL SURFACE UNDERLYING INTER-PIXEL REGIONS

BACKGROUND OF THE INVENTION

1. Field of the Invention

The present invention relates to light valves, and in particular, to pixel cell arrays for silicon light valves which include a reflective metal layer positioned underneath inter-pixel regions.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye.

Two factors dictate the minimum frequency necessary for switching. The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1 shows a cross-sectional view of adjacent thin LC transducer pixel cells in a conventional light valve. Light valve portion 100 comprises adjacent pixel cells 110a and 110b having liquid crystal (LC) material ill sandwiched within gap 106 between a top plate and a bottom plate. Top plate 102 is composed of a translucent material, typically glass. The bottom plate is formed by the reflective metal pixel electrodes 112a and 112b of adjacent pixels 110a and 110b, respectively.

Pixel electrodes 112a and 112b are separated and electrically isolated by trench 118. Pixel electrodes 112a and 112b lie on top of an upper intermetal dielectric layer 128 that is one component of interconnect scheme 104. Interconnect 104 overlies capacitor structures 118a and 118b formed within underlying silicon substrate 105. Underlying capacitors 118a and 118b are in electrical communication with pixel electrodes 112a and 112b, respectively, through metal-filled vias 140 and middle interconnect metallization layer 124 and lower interconnect metallization layer 122.

The conventional pixel array described above in FIG. 1 functions adequately in many applications. However, this design suffers from a number of disadvantages.

One problem is that light incident to array 100 may penetrate through trench 118 between adjacent pixel electrodes 112a and 112b. Intermetal dielectric layer 128 below trench 118 is substantially transparent to this incident light, which next encounters interconnect metallization layer 124. Metallization layer 124 likely bears an anti-reflective coating as a result of prior photolithographic steps. As a result, light incident to inter-pixel regions is absorbed rather than reflected, and is perceived by a viewer as a dark line. This dark inter-pixel region stands in stark contrast to the bright surrounding reflective pixel electrodes. Projection displays can in turn magnify the light reflected from pixel array to such an extent that non-reflective s pace between pixel s is readily observable and may distort the image.

Therefore, there is a need in the art for a pixel array and a process of forming a pixel array where inter-pixel regions exhibit reflectance comparable to reflectance in pixel regions.

Another problem is that the penetration of light into inter-pixel regions can cause distortion of the image displayed by the light valve. Specifically, incident light can travel through a variety of paths in the interconnect and finally enter into the underlying silicon. Penetration of incident light into the silicon substrate induces electrical currents that disturb charge stored in the underlying capacitors. As a result of fluctuation in charge at these capacitors, luminance of the pixel cells may change between succeeding write states, causing the image to "flicker." This flickering reduces image quality, and may cause eye strain in a viewer.

Therefore, there is a need in the art for a pixel array and a process of forming a pixel array that substantially blocks the penetration of incident light through inter-pixel regions in to the underlying substrate.

SUMMARY OF THE INVENTION

The present invention provides a pixel array and process flow for forming the array that positions a reflective metal surface beneath inter-pixel regions. This underlying metal surface reflects incident light, thereby preventing absorption of light in inter-pixel regions giving rise to dark lines between bright reflective pixel electrodes.

A process flow for forming a pixel cell array in accordance with one embodiment of the present invention calls comprises the steps of forming a first dielectric layer over a lower interconnect metallization layer, and forming a second dielectric layer over the first dielectric layer. Next, a window photoresist mask is patterned over the second dielectric layer, the window photoresist mask masking a pixel region and exposing an inter-pixel region. A window is created in the second dielectric layer by etching inter-pixel regions to stop on the first dielectric layer, and the window photoresist mask is removed. A reflective metal layer is formed over the second dielectric layer and within the window, and the reflective metal layer is removed outside of the window. A third dielectric layer is then formed over the reflective metal layer and the second dielectric layer, and a via is formed by etching through the third dielectric layer, the second dielectric layer, and the first dielectric layer to stop on the interconnect metallization layer. Finally, the via is filled with electrically conducting material and a pixel electrode is formed within the pixel region.

An apparatus in accordance with one embodiment of the present invention comprises a plurality of reflective metal pixel electrodes formed over a dielectric layer and separated by inter-pixel regions, and a reflective metal surface positioned in inter-pixel regions underneath the dielectric layer.

The features and advantages of the present invention will be understood upon consideration of the following detailed description of the invention and the accompanying drawings.

DETAILED DESCRIPTION

A pixel array in accordance with the present invention incorporates a reflective metal surf ace underneath inter-pixel regions. This underlying reflective metal surface reflects incident light, preventing absorption of light in inter-pixel regions giving rise to the appearance of dark lines between reflective pixel electrodes, and also blocking incident light from penetrating into the underlying substrate.

Figure 1:
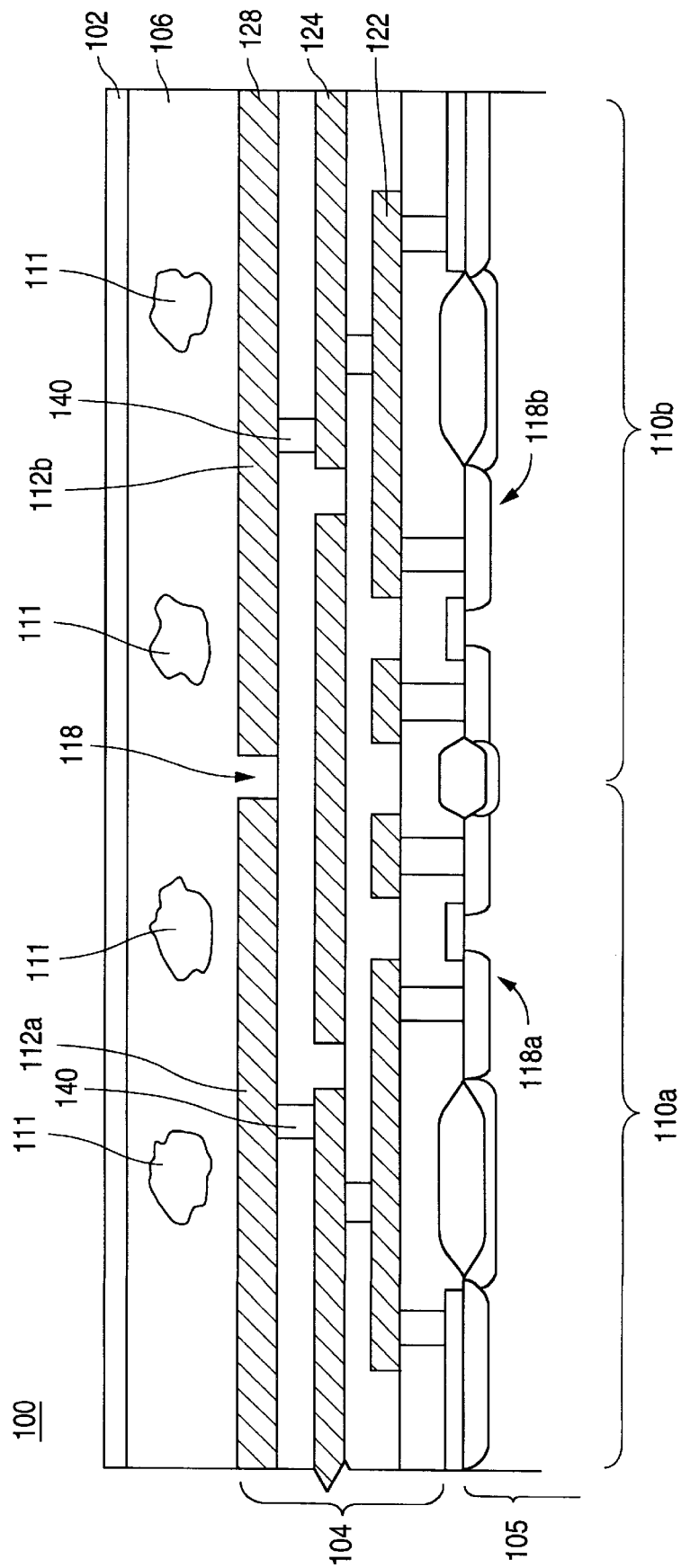
FIG. 1 shows a cross-sectional view of adjacent pixel cells in a conventional light valve.
Figure 2:
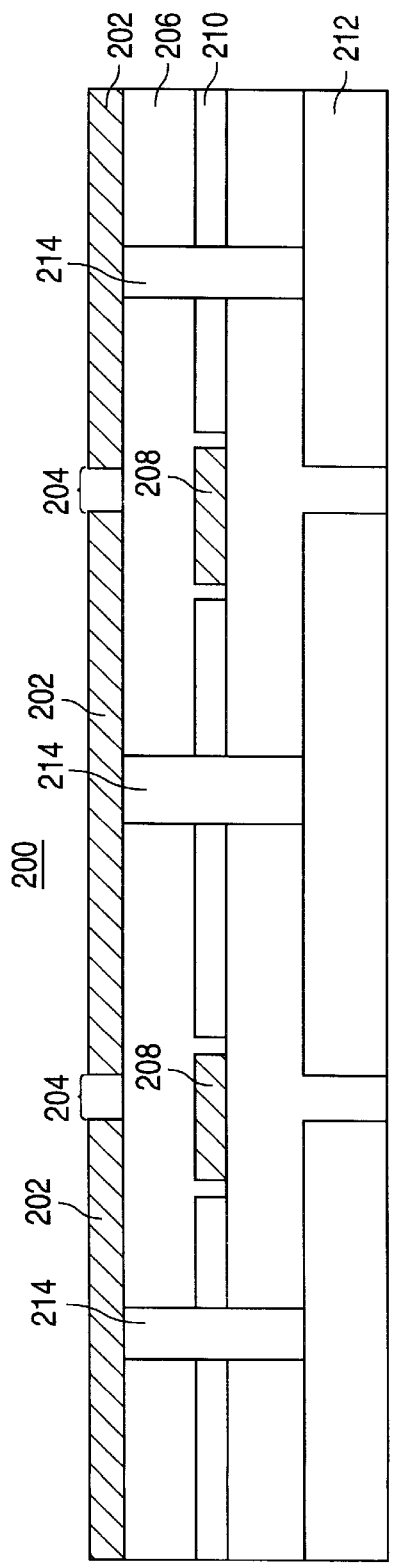
FIG. 2 shows a cross-sectional view of adjacent pixel cells in an array in accordance with a first embodiment of the present invention.

FIG. 2 shows a cross-sectional view of adjacent pixel cells in an array in accordance with a first embodiment of the present invention. Pixel array portion 200 includes adjacent pixel electrodes 202 separated by inter-pixel regions 204. Electrodes 202 are formed over intermetal dielectric layer 206. Pixel electrodes 202 are in electrical communication with underlying interconnect metallization layer 212 through metal-filled vias 214.

Underlying reflective metal surfaces 208 are formed in windows of nitride layer 210 located directly underneath inter-pixel regions 204. Reflective metal surfaces 208 reflect incident light that has managed to penetrate through inter-pixel regions 204 into dielectric material 206.

Figure 3A:
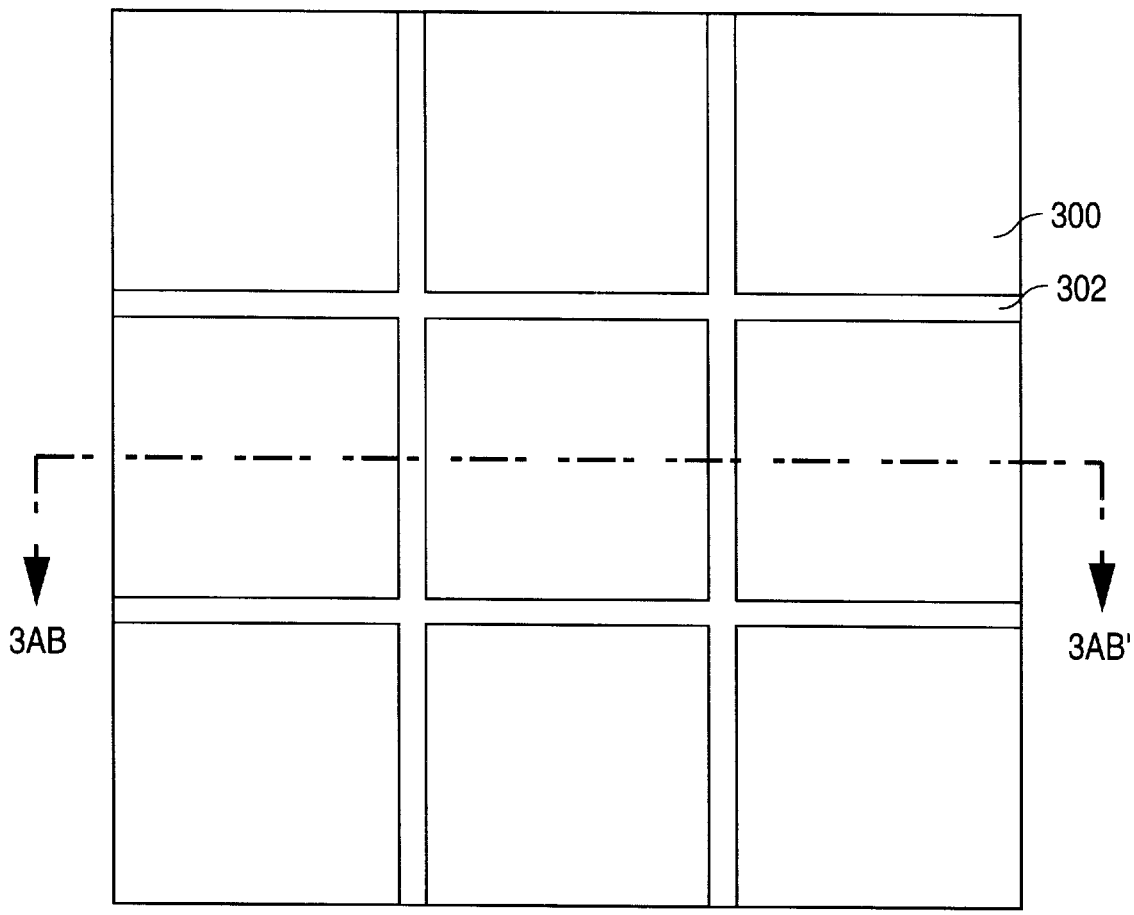
FIGS. 3AA–3IB show top and cross-sectional views of the process steps for forming an array of pixel cells in accordance with the first embodiment of the present invention.
Figure 3A:
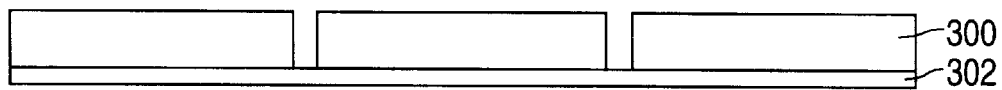
Figure 3B:
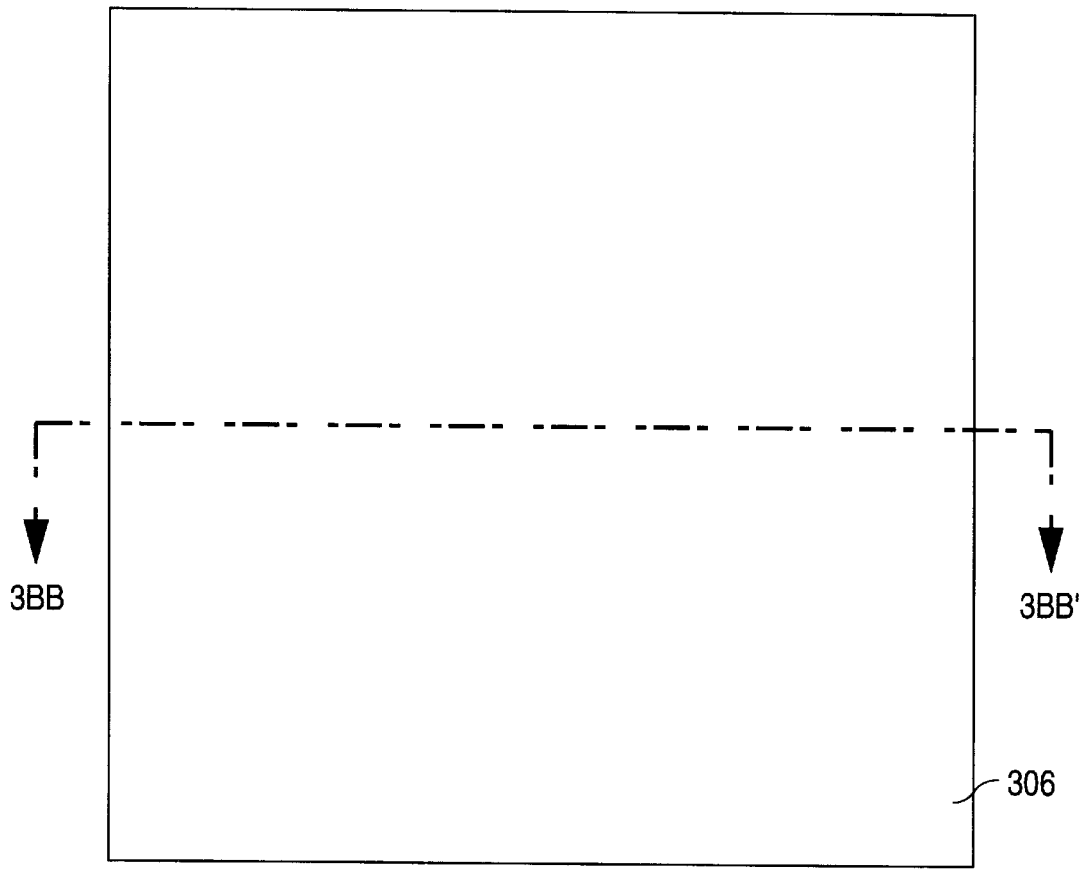
Figure 3B:
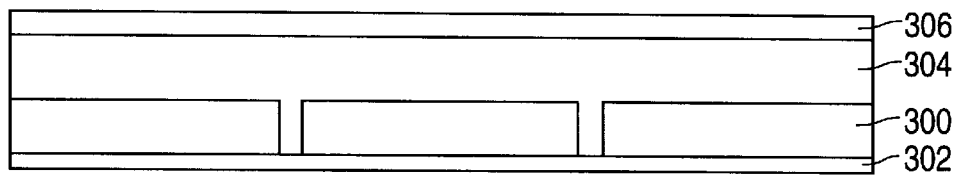

FIGS. 3AA–3IB illustrate the process steps for forming an array of pixel cells in a light valve in accordance with the first embodiment of the present invention. For purposes of convention, all FIGS. 3A illustrate a top view of the pixel cell array, and all FIGS. 3B illustrate a cross-sectional view of the pixel cell array along line A—A' of the FIG. 3A.

FIGS. 3AA–3AB illustrate the starting point for the process. Interconnect metallization layer 300 is patterned on top of lower intermetal dielectric layer 302. FIGS. 3BA–3BB show the formation of upper intermetal dielectric layer 304 over interconnect metallization layer 300 and exposed portions of lower intermetal dielectric layer 302. Nitride layer 306 is then formed over upper intermetal dielectric layer 304.

Figure 3C:
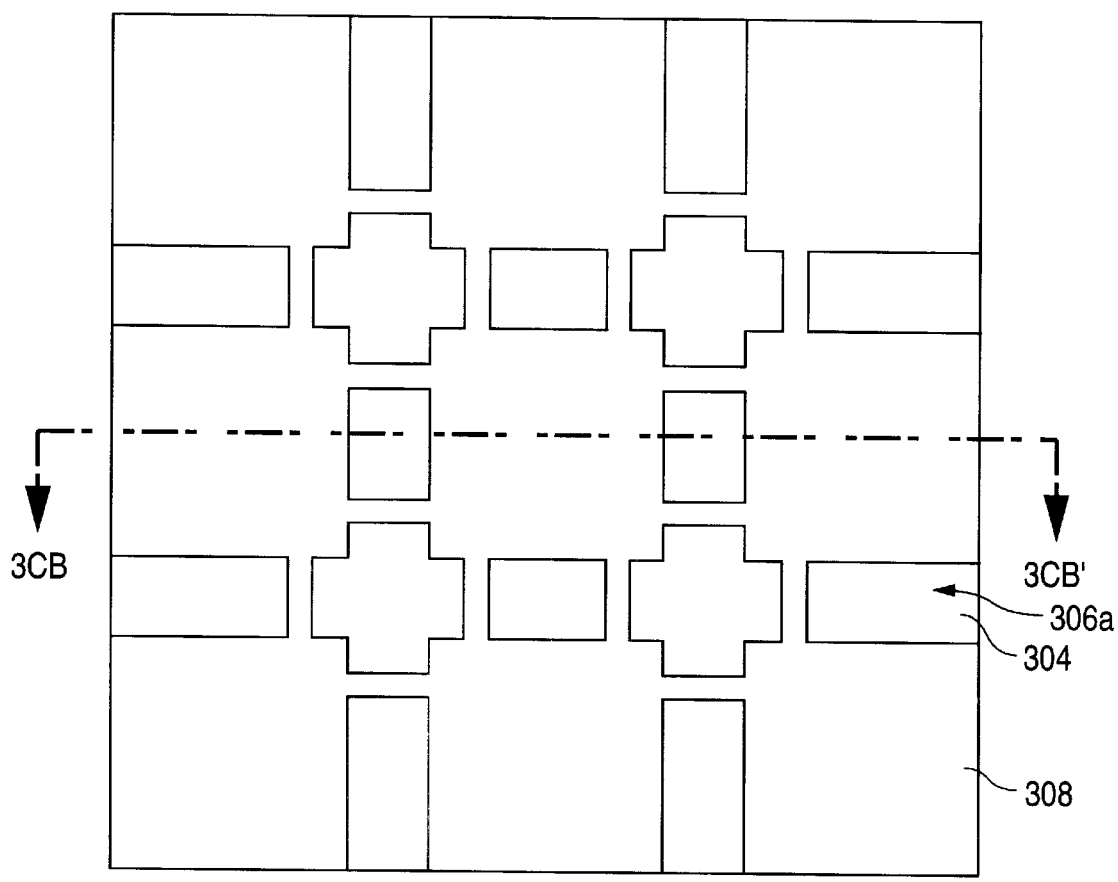
Figure 3C:
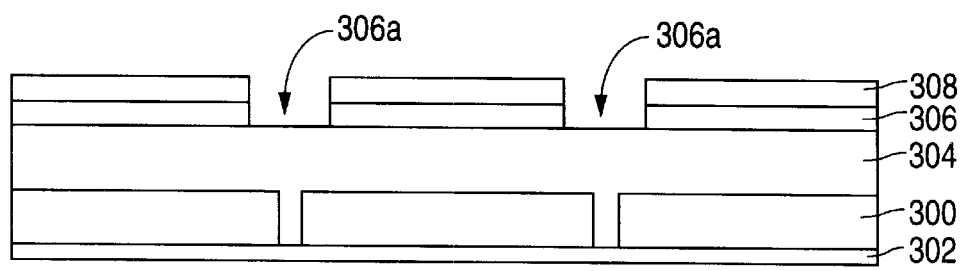
Figure 3D:
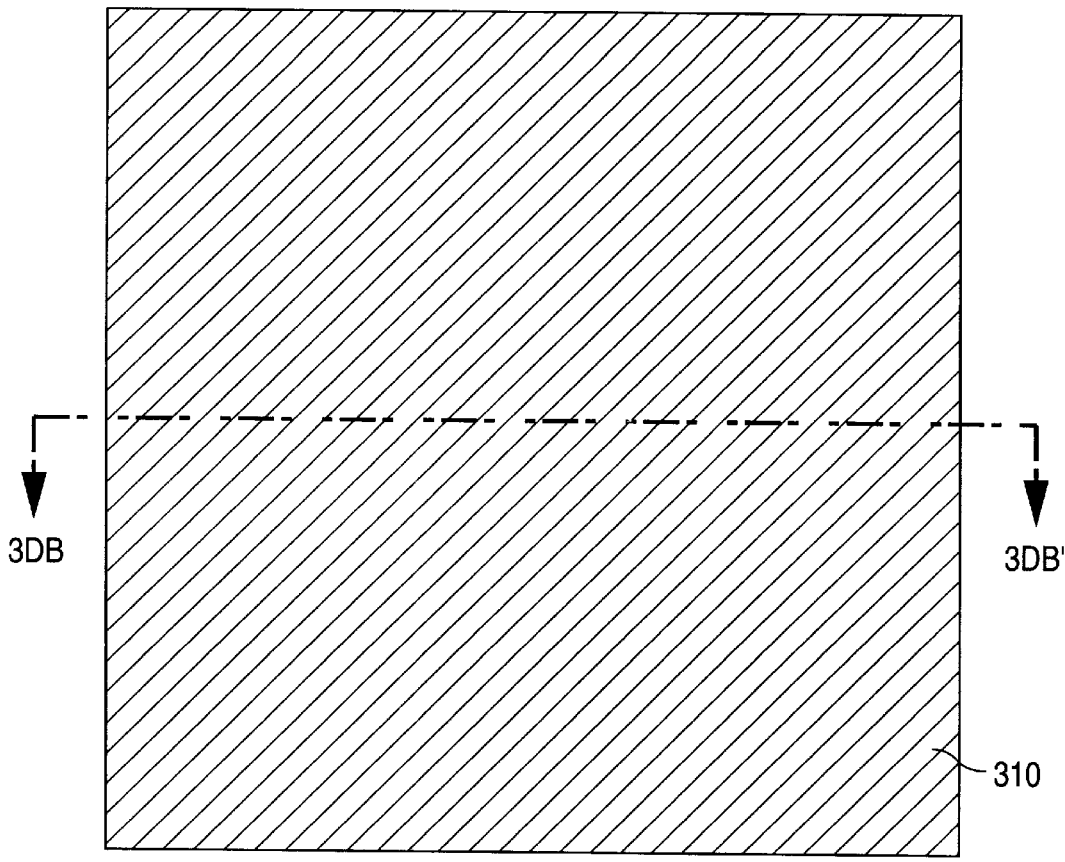
Figure 3D:
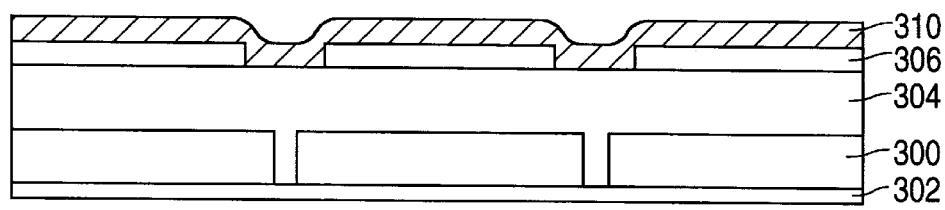

FIGS. 3CA–3CB show the patterning of nitride photoresist mask 308, followed by etching of nitride layer 306 in regions exposed by mask 308 to create windows 306a. FIGS. 3DA–3DB show the removal of nitride mask 308 followed by the formation of reflective metal layer 310 over the entire surface, including within windows 306a of nitride layer 306. In this manner, windows 306a substantially define inter-pixel regions.

Figure 3E:
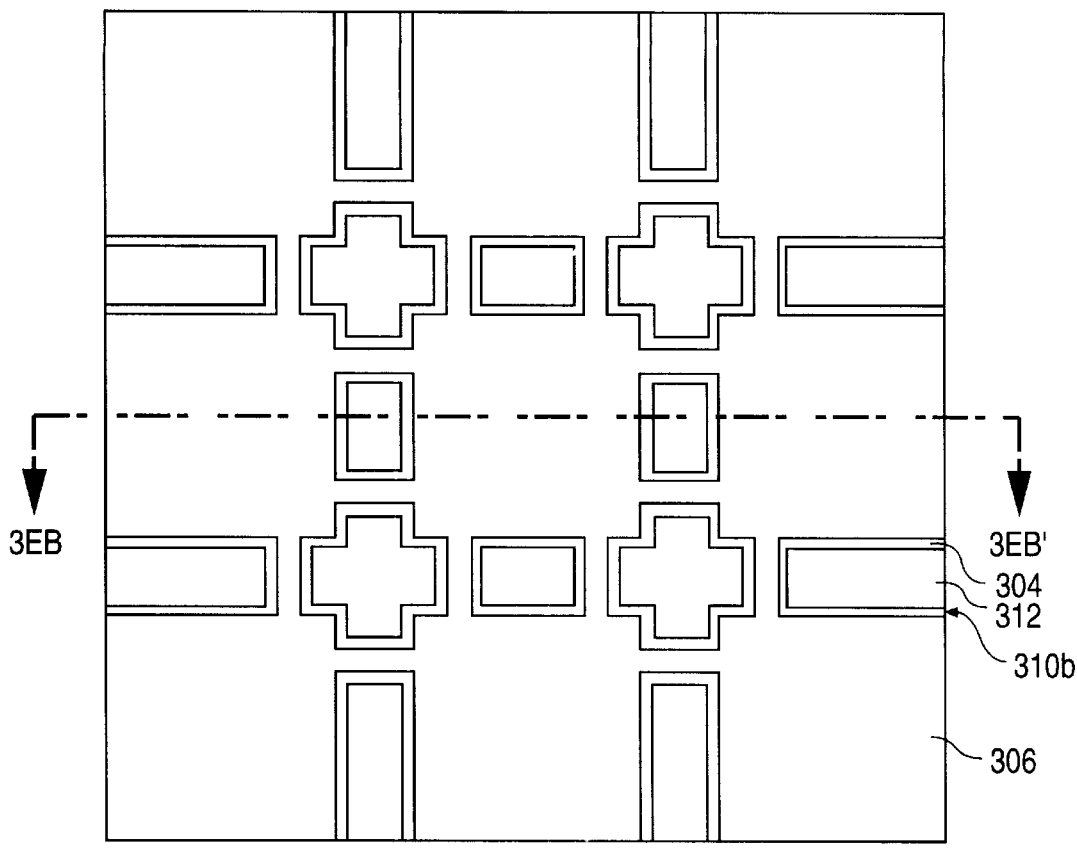
Figure 3E:
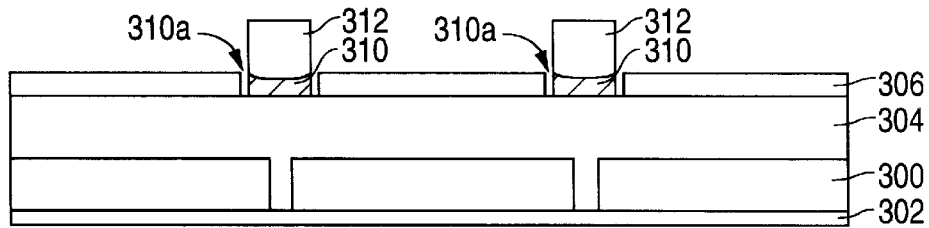

FIGS. 3EA–3EB show patterning of metal photoresist mask 312 over reflective metal layer 310, followed by etching in unmasked regions to stop on silicon nitride layer 306. Metal photoresist mask 312 is slightly narrower than window 306a in nitride layer 306. This slightly reduced dimension exposes raised portions of metal layer 310 that are forced to rise over the ends of the nitride window 306a. This configuration of mask 312 allows removal of these raised metal portions by etching, ensuring the planarity of the remaining metal. However, this mask shape can also create gap 310a along the margin of window 306a.

Figure 3F:
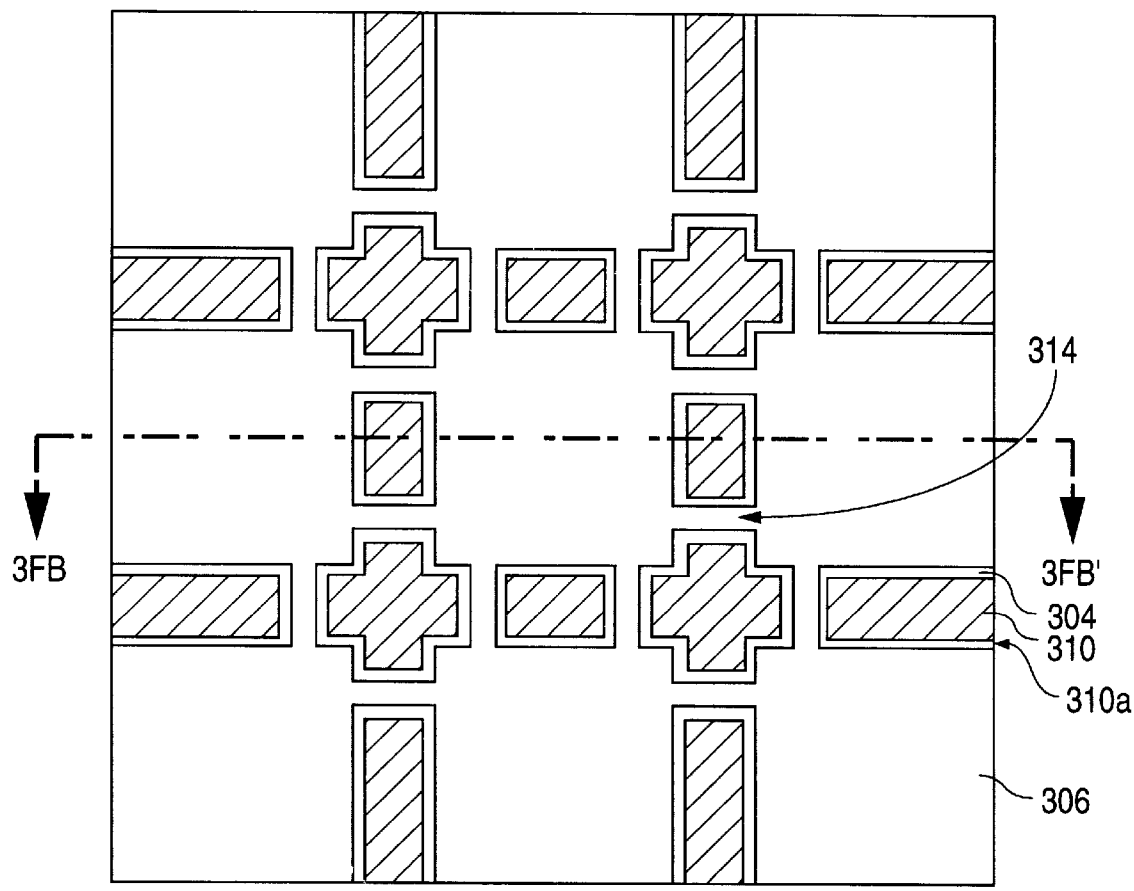
Figure 3F:
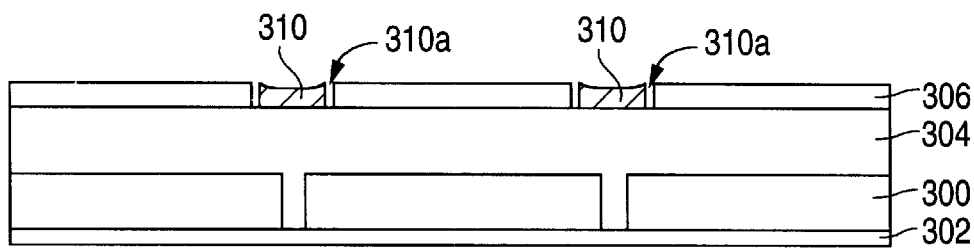

FIGS. 3FA–3FB show stripping of metal photoresist mask 312, revealing reflective metal surface 310 in inter-pixel regions. The relative size of gaps 310a on either side of the reflective metal layer 310 is exaggerated in FIG. 3FB. Specifically, the depth of gaps 310a will be reduced by materials remaining after etching of the reflective interleaved metal layer shown above in FIGS. 3EA–3EB. The depth of gaps 310a will also be reduced by any overetching of nitride layer 306 that occurs during removal of metal layer 310.

Reflective metal layer 310 includes a number of spacings 314. As described in detail below, spacings 314 divide reflective layer 310 into a plurality of discrete, electrically isolated reflective structures. Segregating the reflective metal surface in this manner prevents accumulation of charge on a single conductive metal structure. Build-up of charge on a single continuous reflective metal "grid" could lead to disruptive capacitive coupling across the entire array.

Figure 3G:
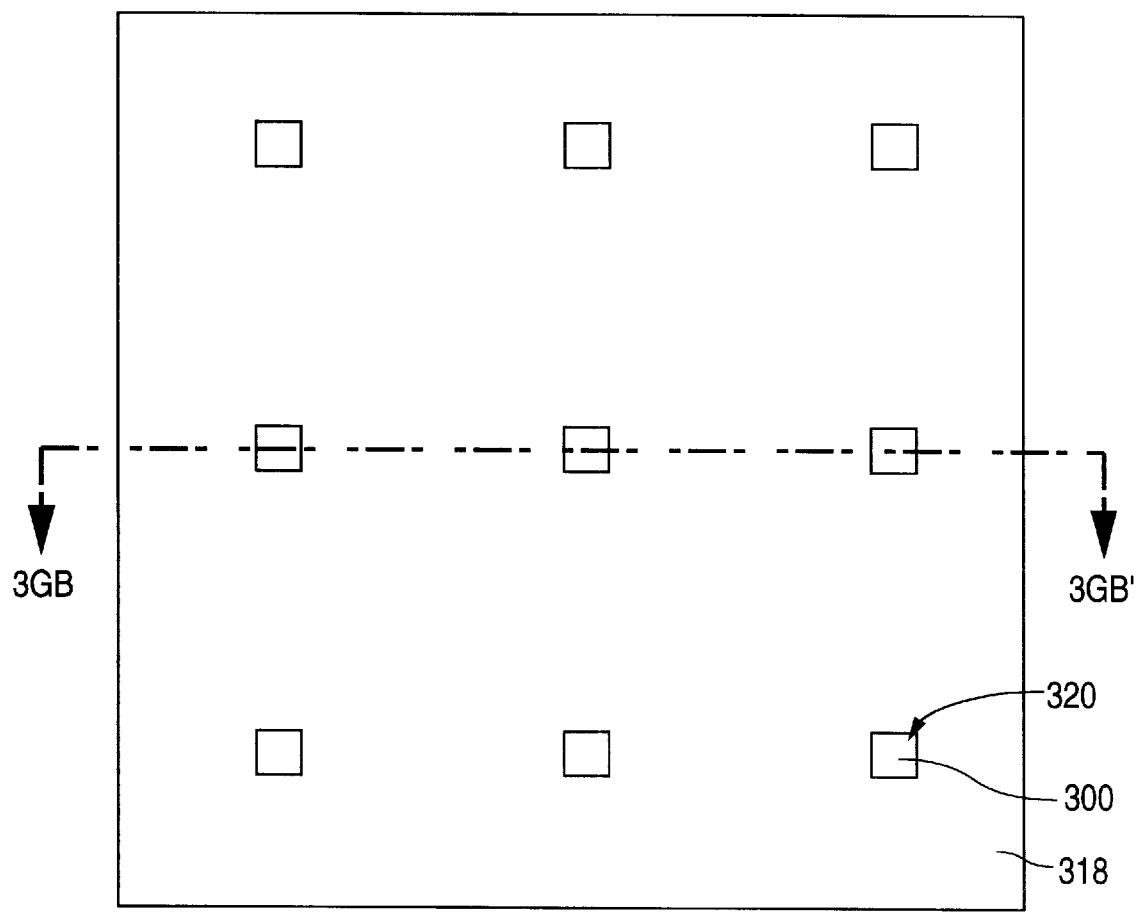
Figure 3G:
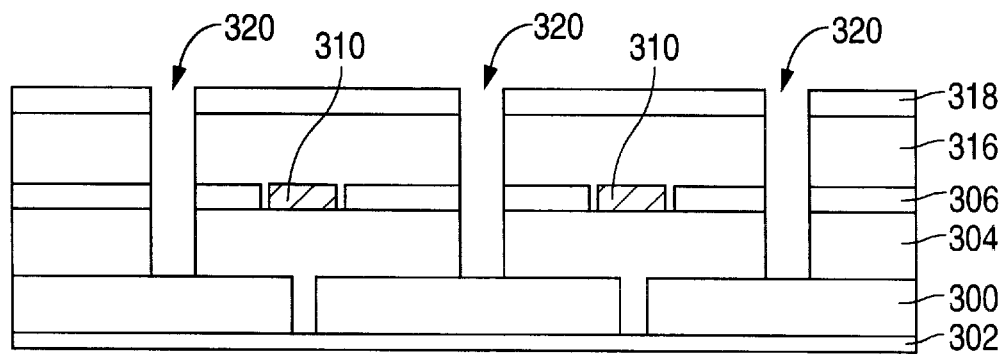

FIGS. 3GA–3GB show the subsequent formation of additional dielectric material 316 over reflective metal surface 310 and nitride layer 306. Via photoresist mask 318 is then patterned over dielectric layer 316, and dielectric material and nitride are etched in exposed regions to stop upon interconnect metallization layer 300, creating vias 320.

Figure 3H:
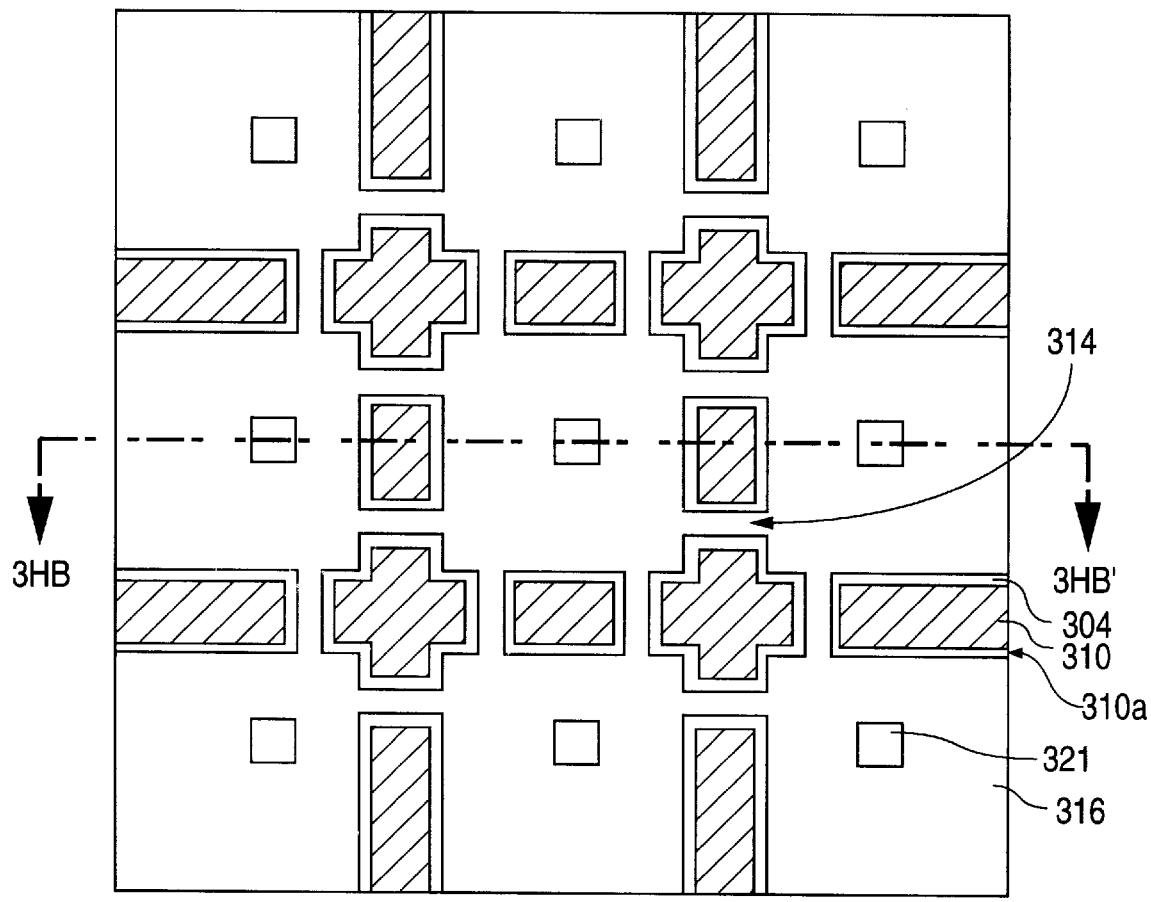
Figure 3H:
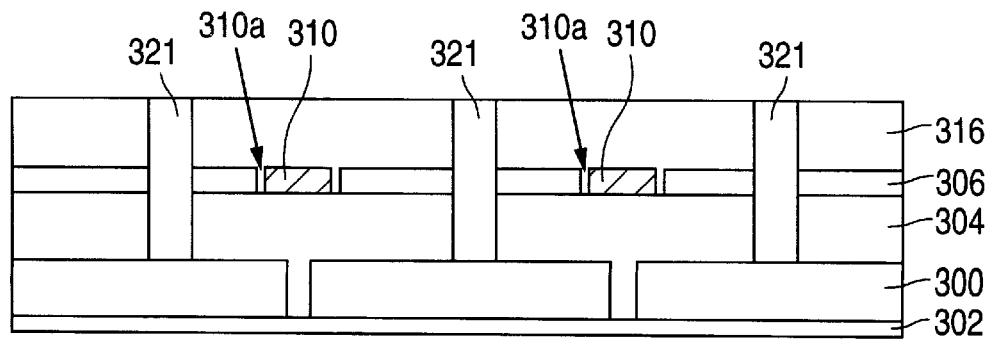

FIGS. 3HA–3HB show the filling of vias 320 with metal 321. In general, this step is performed by depositing a metal (typically Tungsten), followed by chemical-mechanical polishing to remove excess metal. The underlying reflective metal surface is visible in FIG. 3HA because of the optical transparency of dielectric layer 316.

Figure 3I:
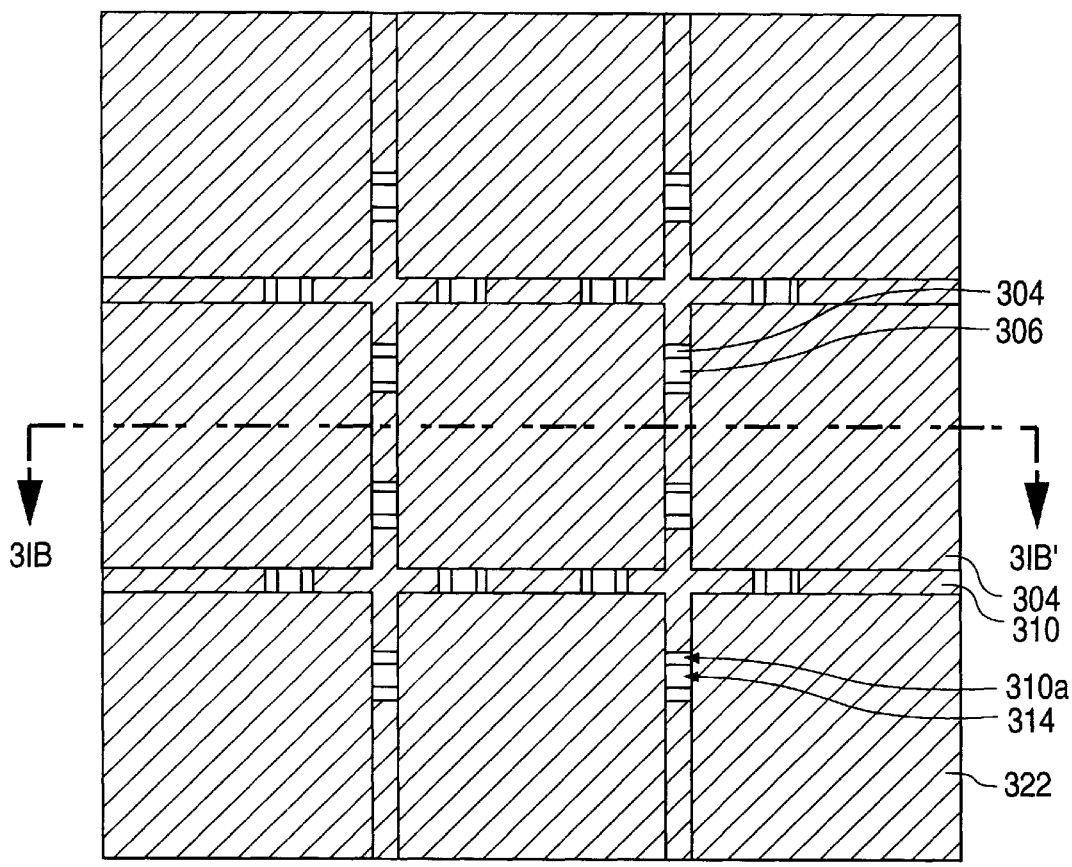
Figure 3I:
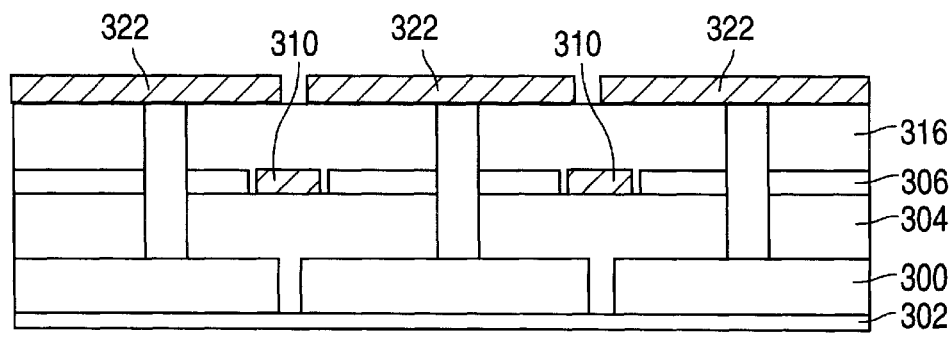

FIGS. 3IA–3IB show formation of reflective metal pixel electrodes 322 in pixel regions, wherein a reflective metal layer is deposited and then masked and etched in inter-pixel regions. With the exception of spacings 314 and gaps 310a, reflective metal surface 310 underlies all inter-pixel regions.

Fabrication of the liquid crystal silicon light valve is completed by adding liquid crystal material, and then sealing a translucent top plate over the structure.

The thin LC pixel cell array and the process for forming this pixel cell array in accordance with the present invention offers a number of important advantages. One advantage is that the pixel array offers a bright reflective backplane, as the underlying reflective metal surface reflects incident light in inter-pixel regions that would otherwise be absorbed. This avoids the appearance of dark lines associated with absorption of incident light in these regions, as encountered in previous array designs.

Although the invention has been described in connection with one specific preferred embodiment, it must be understood that the invention as claimed should not be unduly limited to this embodiment. Various other modifications and alterations in the structure and process will be apparent to those skilled in the art without departing from the scope of the present invention.

For example, as shown in FIGS. 3GA–3GB a layer of dielectric material is formed over the reflective metal layer. The thickness of this dielectric layer can be carefully controlled to generate constructive interference of reflected incident light. Such tailoring of the thickness of dielectric layers to accomplish constructive interference of reflected light is fully described in co-pending U.S. patent application Ser. No. 08/872,013, entitled, "REFLECTANCE ENHANCING THIN FILM STACK," filed Jun. 7, 1997, hereby incorporated by reference.

Moreover, while FIGS. 3FA–3FB depict underlying reflective metal surface 310 as series of discrete floating reflective surfaces separated by spacings 314, this configuration is not required by the present invention. The reflective metal surface underlying inter-pixel regions could assume the shape of a continuous "grid" and which includes a contact for receiving an applied voltage. Maintaining such a continuous "grid" at a fixed bias point in accordance with this alternative embodiment would stabilize reflectance of inter-pixel regions and also enable the designer to anticipate and eliminate unwanted capacitive coupling effects.

During the patterning of the nitride photoresist mask (FIGS. 3CA–3CB) and/or the metal photoresist mask (FIGS. 3EA–3EB), the width of the reflective interleaved pixel layer can be varied to control the extent of lateral overlap with the metal pixel electrode. This lateral overlap is an important array parameter, insofar as the underlying reflective layer can accumulate charge. The charged underlying reflective layer can in turn exert capacitive coupling with the overlying pixel electrodes through the dielectric. This capacitive coupling can distort the effect of the electrodes upon the LC material present above.

In order to avoid this unwanted effect, it is advantageous to provide minimum lateral overlap between pixel electrodes and the underlying reflective metal layer. Of course, the danger of unwanted capacitive coupling must be balanced against the need to provide a reflective surface across the entire width of the inter-pixel region.

Figure 4:
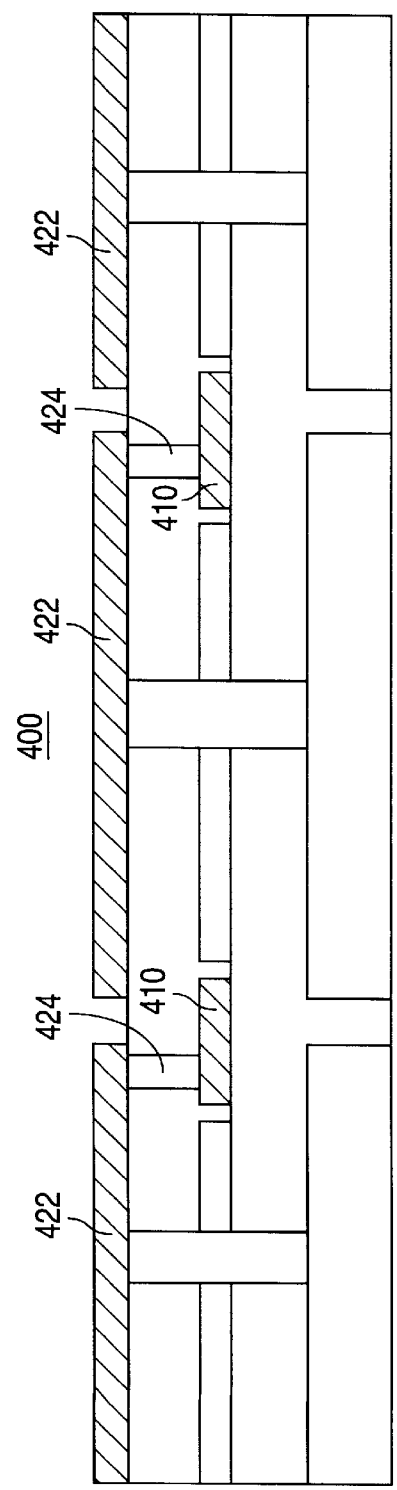
FIG. 4 shows a cross-sectional view of adjacent pixel cells in an array in accordance with a second embodiment of the present invention.

Yet another possible arrangement for the underlying reflective surface is shown in FIG. 4. FIG. 4 shows a cross-sectional view of a portion 400 of a pixel array in accordance with a second embodiment of the present invention. In FIG. 4, the underlying reflective metal surfaces 410 are electrically linked to an adjacent pixel electrode 422 through a second via 424. Second via 424 may be formed in the process flow by an etch of dielectric material selective to metal, followed by deposition of conductive material prior to formation of the pixel electrodes.

Electronic linkage between pixel electrode and adjacent underlying reflective surface as shown in FIG. 4 conveys the advantage of permitting control of the electric field between pixel electrodes by utilizing bias applied to adjacent pixel electrodes.

Therefore, it is intended that the following claims define the scope of the present invention, and that the methods and structures within the scope of these claims and their equivalents be covered hereby.

What is claimed is:

1. A process for forming a pixel array comprising the steps of:

forming a first dielectric layer over a lower interconnect metallization layer;

forming a second dielectric layer over the first dielectric layer;

patterning a window photoresist mask over the second dielectric layer, the window photoresist mask masking a pixel region and exposing an inter-pixel region;

creating a window in the second dielectric layer by etching inter-pixel regions to stop on the first dielectric layer;

removing the window photoresist mask;

forming a reflective metal layer over the second dielectric layer and within the window;

removing the reflective metal layer outside of the window;

forming a third dielectric layer over the reflective metal layer and the second dielectric layer;

forming a via by etching through the third dielectric layer, the second dielectric layer, and the first dielectric layer to stop on the interconnect metallization layer;

filling the via with electrically conducting material; and forming a pixel electrode within the pixel region.

2. The process according to claim 1 wherein the step of removing the reflective metal layer outside of the window further comprises the steps of:

patterning a metal photoresist mask over the reflective metal layer to substantially mask the inter-pixel region and expose the pixel region; and etching the reflective metal layer in the exposed pixel region to stop on the second dielectric layer.

3. The process according to claim 1 wherein the step of forming a pixel electrode further comprises the steps of:

forming a pixel electrode layer over the filled via and the third dielectric layer;

patterning an electrode photoresist mask over the pixel electrode layer to mask the pixel region and to expose the inter-pixel region; and etching the pixel electrode layer in the exposed inter-pixel region to stop on the third dielectric layer.

4. The process according to claim 1 wherein:

the step of forming the first and third dielectric layers comprises forming silicon oxide; and the step of forming the second dielectric layer comprises forming silicon nitride.

5. The process according to claim 1 wherein:

the step of forming the first and third dielectric layers comprises forming silicon nitride; and the step of forming the second dielectric layer comprises forming silicon oxide.

6. The process according to claim 1 further comprising the step of:

forming an electrical contact between the pixel electrode and the reflective metal layer.

7. The process according to claim 6 wherein the step of forming an electrical contact further comprises the steps of:

forming a second via by etching through the third dielectric layer to stop on the reflective metal layer; and filling the second via with electrically conducting material before forming the pixel electrode.

8. A method for preventing absorption of incident light in inter-pixel regions of a pixel array comprising the step of:

providing a reflective metal surface underneath the inter-pixel regions.

9. The method according to claim 8 wherein the step of providing a reflective metal surface comprises forming a continuous reflective metal grid.

10. The method according to claim 8 wherein the step of providing a reflective metal surface comprises forming a plurality of discrete reflective metal surfaces electrically linked to respective adjacent pixel electrodes.

11. A pixel array comprising:
a plurality of reflective metal pixel electrodes formed over a dielectric layer and separated by inter-pixel regions; and
a reflective metal surface positioned in inter-pixel regions underneath the dielectric layer.

12. The pixel array according to claim 11 wherein the reflective metal surface comprises a plurality of discrete reflective metal surfaces.

13. The pixel array according to claim 11 wherein the reflective metal surface comprises a continuous reflective metal grid.

14. The pixel array according to claim 11 wherein the reflective metal surface comprises a plurality of discrete reflective metal surfaces electrically linked to respective adjacent pixel electrodes.

15. A pixel array for a silicon light valve comprising:
a plurality of capacitor structures formed in a silicon substrate;
a plurality of reflective metal pixel electrodes separated by inter-pixel regions, the reflective metal pixel electrodes formed on top of an intermetal dielectric layer overlying the silicon substrate, and the reflective metal pixel electrodes are in electrical communication with the capacitor structures through a plurality of vias; and
a reflective metal surface positioned in inter-pixel regions underneath the intermetal dielectric layer, whereby light incident to the array surface penetrating into the intermetal dielectric underneath inter-pixel regions is reflected by the metal surface.

16. The pixel array according to claim 15 wherein the reflective metal surface comprises a continuous metal grid including a contact for receiving an applied bias.

17. The pixel array according to claim 15 wherein the reflective metal surface comprises a plurality of discrete, electrically-isolated reflective metal surfaces electrically linked to respective adjacent pixel electrodes through second via structures.

18. The pixel array according to claim 15 wherein the intermetal dielectric has a thickness that creates constructive interference of light reflected by the reflective metal surface.

* * * * *